Figure 1:
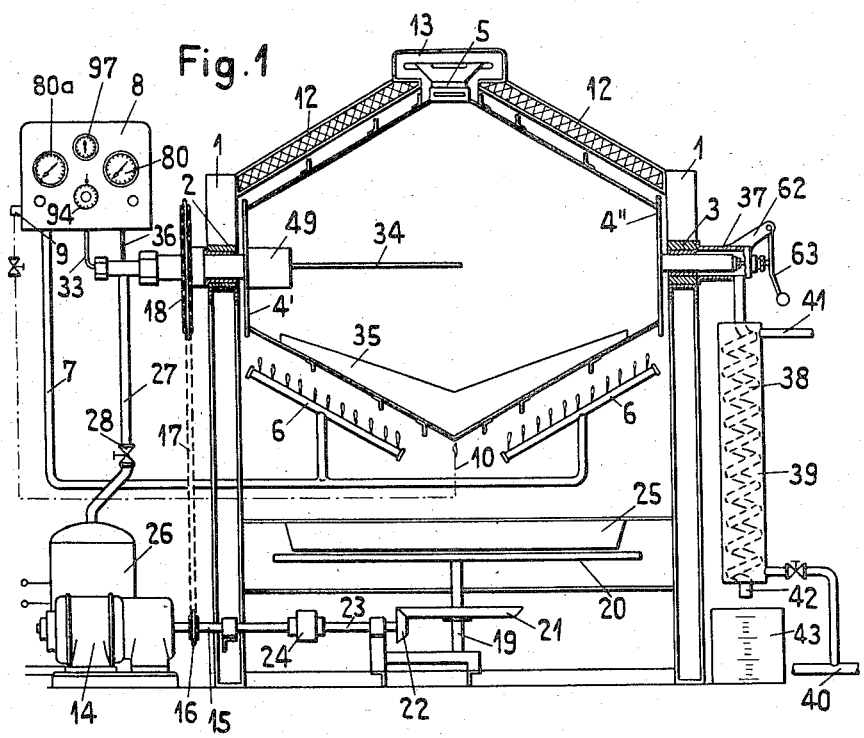

Feb. 24, 1959 W. BRANDL 2,874,483
APPLIANCE FOR ROASTING COFFEE BEANS
Filed July 22, 1953 3 Sheets-Sheet 2

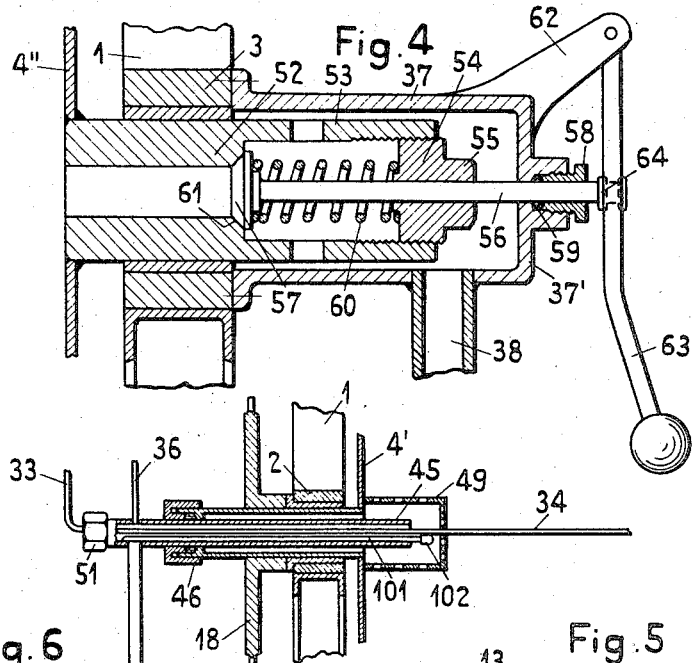
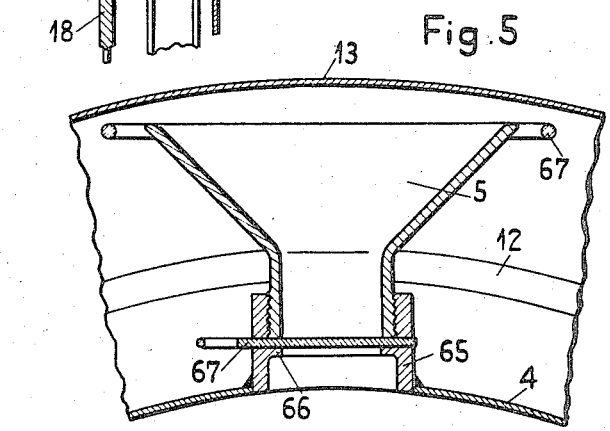
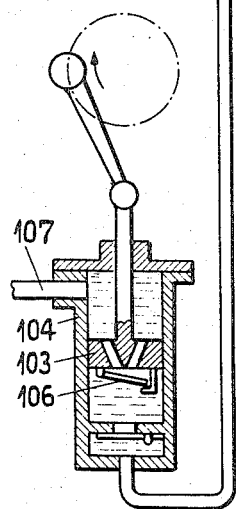
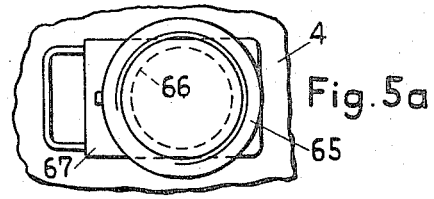

United States Patent Office 2,874,483
Patented Feb. 24, 1959

2,874,483
APPLIANCE FOR ROASTING COFFEE BEANS

Willy Brandl, Zurich, Switzerland

Application July 22, 1953, Serial No. 369,611

Claims priority, application Switzerland July 24, 1952

5 Claims. (Cl. 34—46)

The present invention relates to an appliance or apparatus having a heatable rotatable roasting drum, for roasting coffee beans.

It is the main object of the invention to provide an appliance or apparatus for roasting coffee beans under conditions in which the most important aromatic substances are retained in the roasted coffee beans.

Another object of the invention is to provide apparatus or appliances of this kind which may be readily regulated or controlled in a manner assuring uniformity in the end product when roasting charges of different types or kinds of green coffee beans.

A further object of the invention is to provide an appliance or apparatus of the kind which may be easily operated and controlled for uniform results by persons of no special skill, which is of simple construction for low cost production and operates efficiently for long periods of time without requiring expensive servicings and which may be readily cleaned to remain in a sanitary condition.

The above mentioned objects of the invention, as well as others, along with the advantages thereof will more fully appear as the specification proceeds.

In general the improved appliance or apparatus embodies therein: a rotatable drum, means for heating the said drum to roasting temperature, sealing means keeping the said drum sealed at a pressure exceeding the vapor pressure of the most important aromatic substances of the roasted coffee beans at roasting temperature, and means for cooling the roasted coffee beans inside the said drum under pressure to a temperature below that at which the said aromatic substances are volatile at atmospheric pressure.

Furthermore, the appliance or apparatus embodies a movable obturator means for either opening or for closing the said drum in a pressure-tight manner, means for heating the said drum to the roasting temperature of the coffee beans, a temperature sensitive member inside the said drum responsive to the temperature of the charge of coffee beans, a member visible from outside the said drum for indicating the said temperature therein, another member also visible from outside the said drum responsive to and indicating the pressure prevailing inside the same, a pressure relief member connected to the said drum and automatically opening at a predetermined excess pressure inside the said drum over the atmospheric pressure, and coolant supply means connected to the said drum introducing a controllable amount of a heat-absorbent coolant into the said drum for reducing the temperature of the charge of coffee beans to one below the temperature at which the most important aromatic substances of the roasted coffee beans are volatile at atmospheric pressure, without a drop on lowering of the pressure in the said drum.

Preferably the said temperature sensitive member is operatively connected to the said heating means so as to automatically interrupt and control the heating of the roasting drum when a predetermined roasting temperature of the charge of coffee beans is reached, and the said pressure relief member is adjustable to vary the predetermined pressure at which it relieves the excess pressure inside the said drum.

The normal roasting temperature of coffee is about 200–230° C. and preferably during the roasting operation a pressure of 2–4 atmospheres gauge is maintained in the roasting drum, at which pressure the droplets of etheric oils contained in the coffee beans at least do not boil, i. e., can not evaporate and thereby be lost.

After an appropriate period of treatment at this high temperature the coffee is there cooled without reduction in pressure to a temperature at which the vapor pressure of the aromatic substances retained in the coffee beans is below atmospheric pressure. This temperature is within the range of 110–180° C., and the problem is to cool the coffee beans down to within this temperature range while maintaining a high pressure, whereafter reduction of pressure down to atmospheric pressure is without any detrimental effect on the quality of the roasted coffee beans.

Preferably the coffee beans are cooled under pressure down to a temperature of about 140–150° C. As a coolant, steam of a temperature of 110–180° C. under pressure, or water heated to 110–180° C. and prevented from evaporating by pressure may be used, the coolant being in both cases under a pressure exceeding that prevailing inside the drum.

Advantageously superheated steam, compressed air or water, heated to boiling point under a pressure preventing its evaporation may be introduced from a pressure container as coolants into the roasting drum by opening a certain valve member.

When dry steam or compressed air is used as the coolant, a substantially greater quantity is needed than in the case of water because the heat of evaporation of the water withdraws more heat from the charge of coffee beans being roasted than dry steam or compressed air. The use of compressed air or a compressed oxidizing gas may however have an advantageous effect on the roasting process.

In any case the coolant introduced into the drum is heated therein by the roasting charge and is blown off, for example as steam, through a gas- and steam-relief device without reducing the pressure inside the roasting drum during the cooling period.

Alternatively comparatively cool water, that is water of less than 100° C. may be injected into the roasting drum. Then, however, care must be taken to effect the injection intermittently and with metered small quantities so that the minimum temperature of 110° C. and the minimum pressure in the roasting drum are always at least maintained, so that the water injected can continuously evaporate.

Proper care is taken that the charge of coffee beans is not cooled below 110° C. in the presence of steam or of vapour and therefore there is no danger that the coffee beans will take up water again, because the subsequent pressure relief, down to atmospheric pressure, causes the complete evaporation of water.

With great advantage the vapours escaping through the gas and steam relief member from the roasting drum are passed through a cooled condenser, at the exit of which a metering vessel is arranged so that the quantity of the condensible substances escaping, upon heating the charge to be roasted, is indicated i. e. mainly the water content of the coffee beans before roasting. In this manner it is also made possible to recover any caffeine from the condensate.

Figure 2:
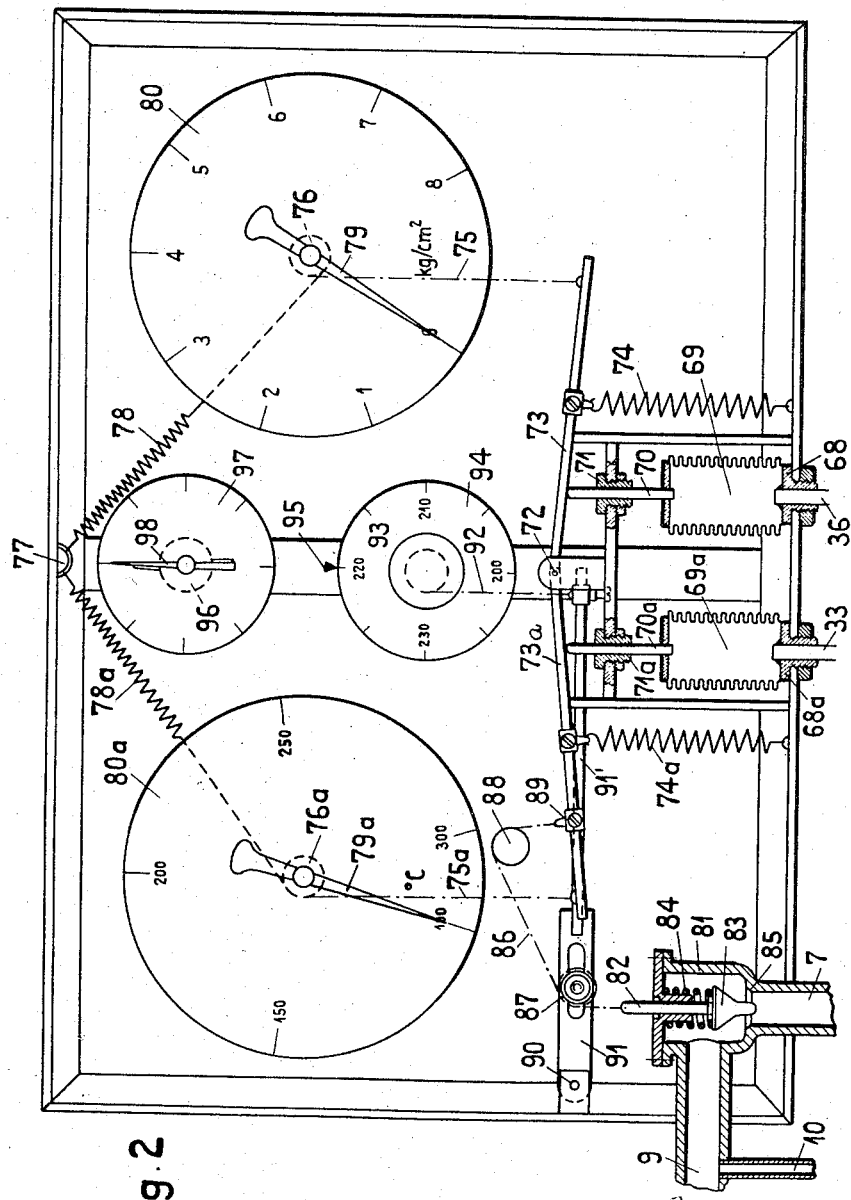

In order that the invention may be clearly understood and readily carried into effect, a preferred embodiment of an appliance or apparatus for roasting coffee beans, according to the invention, will now be described by way of example with reference to the accompanying drawings, in which:

Fig. 1 is a side elevation of the appliance or apparatus as a whole, partly in section in the axial direction of the drum, Fig. 2 shows, partly in section and partly in elevation, on a larger scale, the indicating and control instruments of the said appliance or apparatus, arranged in an instrument chest, Fig. 3 shows on a much larger scale than Fig. 1, the bearing point for that end of the drum through which the various supply and measuring pipes enter into the said drum, Fig. 4 shows in a similar manner the bearing point for the other end of the drum and the associated pressure relief means thereof, Figs. 5 and 5a are respectively, a sectional view and a plan view of the filler opening and obturator means thereof, of the appliance of Fig. 1, on a larger scale.

Fig. 6 is a sectional elevation of a modification of a detail of Fig. 1, on a scale larger than Fig. 1 but smaller than Fig. 3 and which will be more fully referred to later.

Referring first to Fig. 1, the appliance or apparatus embodies a casing 1, the end walls of which are provided with the bearings 2 and 3 for a rotatable roasting drum 4. This drum has a filler hopper 5 capable of being closed, the construction of which will be described later in detail with reference to Figs. 5 and 5a. The drum 4 is heated by two or more gas burners 6 which are connected to a pipe 7 which under the action of a control member, built into the instrument chest 8, is connected to or disconnected from the gas supply pipe 9. A pilot flame burner 10 may be connected with advantage directly to the gas supply pipe 9 in order that gas which emerges from the burners 6 may be automatically ignited.

In order that the hot combustion gases do not escape to atmosphere, the casing 1 also includes lateral walls (not shown) and arched top insulating covers 12. Said covers are arranged to leave between them a gap or space, in which the filler hopper 5 can move in the rotation of the drum 4. This gap is covered by a belled or channel like hood 13 which may be manipulated, so that the filler hopper 5 is accessible.

Suitable means (not shown) vents the space surrounding the drum 4 to atmosphere.

The drum 4 is driven by an electric motor 14 the output shaft 15 of which drives a sprocket wheel 16 that is connected by a link chain 17 to a sprocket wheel 18 in turn connected with the drum 4 for rotation.

Below the drum a horizontal disc 20 is mounted on a vertical shaft 19. A bevel gear 21 meshes with a bevel gear 22 keyed on a shaft 23. A clutch 24 capable of being engaged and disengaged, allows the establishment of a direct driving connection between the two shafts 23 and 15 which are in alignment with one another so that accordingly the shaft 19 can be driven at will from the motor 14. The disc 20 serves for cooling the coffee beans discharged from the drum 4 as later mentioned, and for this purpose cooperates with stationary guide or stirring vanes 25.

A container for a coolant medium under pressure is associated with the appliance or apparatus and, in the present case the same is shown in Fig. 1 as, a water container 26 in which water may be stored and heated to boiling temperature under a pressure preventing its evaporation, in the present case to say 140° C.

The said container is connected, through a pipe 27 and control valve 28, with the drum 4, as will be explained more in detail with reference to Fig. 3. On the front face of the instrument chest 8 there is provided a temperature indicating instrument 80a, a pressure indicating instrument 80, an adjustable time piece 97 and an adjustment member 94 (Figs. 1 and 2).

The temperature indicating member is connected by the pipe 33 with a temperature sensitive feeler 34 (see also Fig. 3) which extends through the bearing 2 and axially into the drum for a distance passing beyond the plane of the axis of the hopper 5.

On the interior of the drum 4 vanes 35 are arranged to carry along the charge of coffee beans to be roasted and make the same revolve or otherwise move, in the interior of the drum. In the rotation of the drum the charge of coffee beans being roasted drops time and again on to the temperature feeler 34 so that the same assumes substantially the actual average temperature of the charge of beans being roasted. The pressure indicating member 80 is connected through a pipe 36 with the interior of the drum, and serves for the current indication of the pressure prevailing in the drum. The instruments of the chest 8 and the manner of introduction of their pipes into the drum will be explained more in detail later with reference to Figs. 2 and 3.

A gas and steam discharge valve 37 at the exit of the drum 4 will be described later more in detail with reference to Fig. 4. It passes all gases and vapors emerging from the drum 4 through a condenser which includes a coiled pipe 38 which is cooled in a cooling jacket 39 to the bottom of which cooling water is supplied from a pipe 40, the said water being drained off from the top as at 41. The condensed vapors are discharged as at 42 as a condensate into the metering vessel 43 where they may be collected and measured as regards quantity.

Referring now to Fig. 3, in the front wall 4' of the drum 4 a hollow trunnion 44 is inserted in a gas tight manner, said trunnion is journalled in the bearing 2 and has the sprocket wheel 18 keyed upon it. Coaxially of this hollow trunnion 44 a stationary pipe 45 is introduced into the drum, and a gland 46 cooperates in the usual way with an internal shoulder 47 and a packing ring 48 in such a manner that in the rotation of the trunnion 44 upon the tube 45 no gases can escape along this juncture.

A coolant supply pipe 27 and a pressure gauge pipe 36 each opens into the said tube 45. In order that the coolant supplied may flow unhampered into the drum 4, the sieve-like perforated end portion 45a of the tube 45 which projects into the drum is covered by a perforated cap 49 which prevents the coffee beans from covering the point of entry of tube 45.

Coaxially of the tube 45 there is arranged a small connecting tube 50 for the temperature gauge pipe 33 and the temperature feeler 34. The feeler 34 is formed as a hollow body closed at its inner end within the drum 4. The connecting tube 50 has a heat-insulating wall so that only the temperature of the feeler 34 which is relevant is indicated at the instrument 80a. The outer end of the tube 45 is sealed by a cap nut 51.

Referring now to Fig. 4, in the second end wall 4" of the drum, is a hollow trunnion, 52, and is rotatably journalled in a gas tight manner in the bearing 3. It has a perforated outer end extension 53 into which a closure piece 54 is screwed, the outer end of which is formed as a polygonal head 55. The valve casing 37 surrounds this end extension 53 of the hollow trunnion 52, and is detachably secured to the associated end wall of the casing 1.

The spindle 56 of a conical valve 57 is so arranged as to be rotatable and shiftable in an axial bore of the closure piece 54, 55 and in the end wall 37' of the casing 37, a gland screw 58 acting on a packing ring 59 in such a manner that no gas can escape along the passage for the spindle 56 through said end wall 37'.

A spring 60 abuts at one end against the closure piece 55, and at its other end against the valve cone 57, and tends to press said valve cone against the valve seat 61 in the interior of the trunnion 52. The spring force and accordingly the limiting pressure in the drum 4 can be varied by turning the closure member 54. On a bracket 62 of the casing 37 a relief lever 63 is pivoted and is connected to the valve spindle 56 by means of a roller coupling 64 and this in such a manner that said valve spindle may turn unhampered relative to the trunnion 52, but can be shifted longitudinally to the right (see Fig. 4) for the purpose of opening the valve.

Referring now to Figs. 5 and 5a the filler hopper 5 is screwed into a tubular socket 65 which projects in a radial direction from the drum 4. Above an inner shoulder 66 of this tubular socket there are diametrically opposed circumferential slots which allow the insertion of a slide plate 67 which is pressed against the upper face of the shoulder 66 when the hopper 5 is screwed tightly into said socket 65 and, which face forms accordingly a seat for said plate 67. By unscrewing the hopper 5, the upper edge of which is provided for this purpose with handles 67', the slide plate 67, is loosened. Any excess pressure which might still be prevailing in the drum 4 can not, however, cause a displacement of the obturator member because the plate 67 is shiftable in its own plane only. Merely the gases and vapours enclosed can escape laterally through the aforesaid slots.

Referring now to Fig. 2 the measuring and control members will now be described.

The pressure gauge pipe 36 issues into the stationary bottom 68 of a bellows or capsule 69 the top of which carries a pin 70. This pin is shiftably guided in the central bore of a stationary guide piece 71 in the vertical direction. Since the interior of the bellows 69 is constantly in communication with the interior of the drum 4 through gauge pipe 36 and tube 45, the said bellows is permanently under the same pressure as prevails inside the drum 4, and the bellows 69 accordingly tends to expand.

The end of the pin 70 abuts against the underside of a lever 73 which is pivoted to tilt or rock about a horizontal pin 72 and which lever is pulled downwards by the action of a tension spring 74. At the outer end of the lever 73 a pull cord 75 is attached and is passed round a pulley 76 and is further attached to the end of a tension spring 78 secured to the chest 8 at 77. The tensile power of the spring 74 overrides substantially that of the spring 78 so that the latter has merely the task of keeping the pull cord 75 tight. On the pulley 76 a pointer 79 is mounted which plays over a scale dial 80 calibrated in atmospheres gauge.

This pointer accordingly indicates permanently the pressure prevailing inside the drum 4.

In a basically very similar manner the temperature indicating device 80a is constructed; and the components corresponding to those described hereinbefore for the pressure indicating device have the same reference numbers plus the index a, viz.: 68a, 69a, 70a, 71a, 73a, 74a, 75a, 76a, 78a, 79a and 80a, with the difference that the scale of the dial 80a is calibrated in degrees centigrade. The bellows 69a, the position of the pointer 79a and the dial 80a is a function of the temperature of the feeler 34 and likewise of the charge of beans being roasted. The bellows 69a, the gauge pipe 33, the connecting pipe 50 and the feeler 34 form between themselves a closed hollow space, the internal pressure of which is dependent upon the temperature of the feeler 34. This space may be filled with air or with a dry vapour. Alternatively it may be filled totally with a liquid, or it may be evacuated and partly filled with a liquid so that the vapour pressure depending on the temperature determines the internal pressure.

The level position of the lever 73a, i. e. the temperature measured by the feeler 34, is used in addition for obturating and controlling the supply of gas to the burners 6 through the pipe 7 at a predetermined temperature. For this purpose in a valve casing 81 the spindle 82 of a valve cone therein is vertically shiftable, and a compression spring 84 tends to press the valve cone 83 against the valve seat 85 and thereby to throttle the flow of gas from the pipe 9 into the pipe 7 to the burners 6.

At the end of the valve spindle 82 a pull cord 86 is attached and then passed over deflector rollers 87 and 88 to a slide 89, which is slidable and capable of being fixed on the temperature responsive lever 73a.

The deflector roller 88 is journalled on a stationary pivot in the chest 8. On the other hand, the deflector roller 87 is journalled on a lever 91 which is tiltable about a horizontal pin 90. From the free end of an extension 91' of the lever 91 a pull cord 92 is passed over a storage drum 93 journalled in the chest and said drum is connected for rotation with an adjustment disc 94. By turning the disc 94 relative to a stationary marker 95 the lever 91 is accordingly either raised or lowered. Thereby either the distance measured along the cord 86 between the slide 89 and the valve spindle 82 may be increased or shortened. When raising the lever 91, the valve 83, too, is consequently lifted further from its seat 85, and when lowering the lever 91 the valve 83 is adjusted more towards its closing position. In the first mentioned case the temperature of the feeler 34 must rise higher before the valve 83 is closed by a corresponding clockwise movement of the lever 73a about its pivot 72 than in the second case. The disc 94 accordingly forms an adjustment member, by means of which the temperature of the charge to be roasted can be adjusted at which the heating is automatically interrupted.

The valve cone 83 is so shaped that the supply of gas through the pipe 7 is firstly throttled very gradually, and is later completely obturated or closed.

Obviously the springs 78a, 84 and 74a have to be turned with respect to one another in such a manner, that the characteristic of control desired is attained. The shifting of the slide 89 along the lever 73a and the adjustability of the roller 87 along the lever 91 facilitate the attaining of the characteristic of control desired.

A time piece 96 can be wound up by means of an arm 98 which is rotatable by means of the time disc 97, the said arm 98 subsequently running back at a controlled speed.

When roasting the coffee beans the procedure is as follows:

After unscrewing but not removing the hopper 5 from the collar 65, when said hopper is in the position shown in Fig. 1, and pulling out the slide 67, a predetermined quantity of raw coffee beans can be filled or charged into the drum 4 through said hopper. Thereafter the slide 67 is pushed in again and the hopper is screwed into said collar so as to clamp the slide in its closed position.

Since in the initial stage of a roasting operation, the temperature in the drum 4 is relatively low, the gas control valve 83—85 is open, and the burners 6 are in operation. The motor 14 is switched on, so that the drum 4 is set in rotation. The charge is heated, and after exceeding the boiling temperature of the water contained in the coffee beans, said water evaporates so that the pressure in the drum 4 rises.

The rise of pressure in the drum 4 is currently indicated by the position of the pointer 79 on the dial 80, and the temperaure of the charge being roasted is currently indicated by the position of the pointer 79a on the dial 80a. The pressure rises up to a limit value which is determined by the force of the spring 60. At this value the pressure will remain, any vapors additionally generated flowing off through the valve casing 37 into the condenser 39. In the metering vessel 43 the condensate accumulates, and its quantity can be read off. At a temperature adjusted e. g. to 210° C. of the charge roasted the gas supply pipe 7 is cut off automatically by means of the valve 83, the time lag for completely switching off the heating having been adjusted by the operative by means of the time piece 97 to a period ascertained by experience, say to 5 minutes. In this time the temperature of the charge being roasted rises slightly further to say 220° C. After the lapse of a predetermined time the valve 28 is opened by the operator, and a mixture of water heated to boiling temperature under pressure and steam flows into the drum 4, the pressure of this coolant being higher than the pressure in the drum. The steam escapes through the valve 37, 57 without the pressure in the drum 4 diminishing during this phase. However, the coffee cools down to the temperature of the steam, so that the temperature of the charge being roasted and indicated by the pointer 97a quickly drops to the value of 140° C. This temperature lies below the boiling point of the most important aromatic substances of the coffee, so that when the valve 37, 57 can be released by operating the lever 63 after closing the valve 28, without the danger of losing said aromatic substances by evaporation. In this closing down phase a check valve (not shown) in the gas supply pipe 9 is closed.

The hopper 5 can now be opened again, and the plate 67 withdrawn. After turning the drum 4 through 180° from the position shown in Fig. 1, the roasted coffee beans pass out through said hopper to drop on to the disc 20, whereafter a new charge can be filled into the drum 4 when it again reaches said position of said Fig. 1. For the purpose of cooling further the roasted coffee beans, the clutch 24 is then engaged to connect the shafts 15–23 whereby the disc 20 is set in rotation.

Because of the special requirements of the users of the appliance or apparatus and because of the peculiarities of the different kinds or grades of coffee beans to be roasted the operator must be able to vary the roasting conditions for each grade and kind of bean. Therefore the fully automatic operation has received no consideration. For example the quantity of the condensate obtaining in the preheating phase shows the content of the raw coffee beans in water, and it is possible to adjust the end temperature of roasting to the value desired, as well as the time during which the coffee beans are kept at the maximum temperature, the selection being carried out by the operator.

Instead of the use of water heated to boiling temperature under a pressure preventing its evaporation, or of dry steam or compressed air, relatively cool water can be used for the cooling.

In this case means are provided for injecting such cool water intermittently, in metered quantities, into the drum 4. Such a device is diagrammatically represented in Fig. 6.

Through the tube 45 an injection tube 101 is introduced into the drum 4 which terminates in an injection nozzle 102. The tube 101 is connected to the pressure side of a piston pump 104 which may be operated by hand, a non-return valve in the tube 101 (not shown) preventing the excess pressure inside the drum 4 from acting on the pressure side of the piston 103 which is shiftable in the cylinder of the pump 104. Cool water from pipe 107 can through valve 106 reach the underside of the piston 103 on the upward movement thereof. At each down-stroke of the piston 103 a predetermined quantity of water is injected into the drum 4, and the operator can cease injecting water any time the temperature of the charge roasted has dropped below for example 130° C. Since at these high temperatures the water injected evaporates continuously, the pressure in the drum 4 remains unchanged.

It is pointed out that in the rotation of the drum 4, the vane or vanes 35 thereof, will carry the roasting coffee beans, from the bottom of the drum, upwardly and after said vane or vanes has passed above the plane of the axis of the drum, said beans will spill from said vane toward the bottom of the drum with a tumbling action. In this spilling movement of said beans, some of them will engage or contact the feeler 34 and transfer heat thereto so that said feeler substantially assumes the temperature of the roasting coffee beans. This spilling action also produces a good mixing action of the beans, thereby assuring a uniform roasting thereof.

While I have described and illustrated what may be considered typical and particularly useful embodiments of my said invention, I wish it to be understood that I do not limit myself to the particular details, dimensions and temperatures described and illustrated, for obvious modifications will occur to a person skilled in the art.

What I claim as my invention and desire to secure by Letters Patent, is:

1. In an apparatus for roasting coffee beans comprising a closed roasting drum mounted to rotate about a horizontal axis, vanes mounted in the drum for producing a tumbling action of the beans during rotation of said drum in which said beans are carried upwardly and fall by gravity through the axial center area of said drum, heating means mounted beneath said drum to heat the contents to a roasting temperature, pressure responsive valve means in said drum to relieve excess pressure beyond a predetermined amount and maintain a constant pressure in said drum, a temperature responsive element projecting into and extending coaxial with said drum and arranged in the path of the coffee beans falling by gravity through said central axial area so that said temperature responsive means will be engaged by said coffee beans in heat transfer relation therewith, means for introducing a cooling medium under pressure into said drum and means for charging the roasting drum with green beans and for discharging roasting beans therefrom.

2. In an apparatus for roasting coffee beans comprising a closed roasting drum mounted to rotate about a horizontal axis, vanes mounted in the drum for producing a tumbling action of the beans during rotation of said drum such that said beans are carried upwardly and fall by gravity through the axial central area of said drum, heating means mounted beneath said drum to heat the coffee beans to a roasting temperature, pressure responsive valve means in said drum to relieve excess pressure and maintain the pressure in said drum substantially constant, a temperature responsive element projecting into and extending coaxial with said drum and arranged in the path of the coffee beans falling by gravity through said central axial area such that said beans will engage said temperature responsive element during their fall by gravity, control means for said heating means, means for connecting said temperature responsive means to said control means to regulate the temperature in said drum, means for introducing a coolant into said drum under pressure, and means for charging and discharging green beans and roasted beans respectively in said drum.

3. In an apparatus for roasting coffee beans, comprising a closed roasting drum mounted to rotate about a horizontal axis, trunnions supporting said roasting drum at each end thereof, vanes mounted in said drum for producing a tumbling action of the beans during rotation of said drum in which said beans are carried upwardly and fall by gravity through the axial central area of said drum, heating means to heat the contents of said drum to a roasting temperature, pressure responsive spring loaded valve means in said drum to maintain a constant pressure therein, a temperature responsive element projecting through one of said trunnions and extending axially into the interior of said drum and arranged in the path of the coffee beans falling by gravity through said central area so that said temperature responsive means will be engaged by said coffee beans in heat transfer relation, a coolant supply pipe extending through said trunnion and arranged concentric with the temperature responsive element, means for supplying coolant under pressure through said coolant pipe, a screen element mounted in said drum enclosing the end of said coolant pipe to prevent coffee beans from being forced therethrough, control means for said heating means operable in accordance with changes in temperature recorded by said temperature responsive element, means for charging green coffee beans into said drum and means for discharging roasted coffee beans from said drum.

4. Apparatus for roasting coffee beans embodying therein a roasting drum mounted for rotation about a horizontal axis, means in the drum producing a tumbling action of the beans in a rotation of said drum, means for heating said drum to roasting temperature, means responsive to the temperature of the roasting beans in the drum for controlling said heating means and including a member arranged in the drum in a position for engagement by the tumbling beans in the drum for heat transfer engagement thereby, and means for charging the roasting drum with green beans and for discharging roasted beans therefrom, in which said means for charging the same with green beans and for discharging roasted beans includes a tubular socket carried by said drum and arranged radially thereof, a sealing member arranged in said socket for movement in the general direction of the axis of the drum for opening and closing of said socket and a hopper member mounted in the socket for movement toward and away from the axis of the drum for locking the sealing member in sealed position and for unlocking said sealing member for its removal from said socket for the passage of beans through said socket in the charging of beans into and the discharging of beans from said drum in different positions of said drum.

5. Apparatus as set forth in claim 4 and wherein the hopper member has a threaded engagement in said socket and when threaded into said socket it engages said sealing member to lock it in its sealing position.

References Cited in the file of this patent

UNITED STATES PATENTS

| | | |
|---|---|---|
| 75,829 | Babbitt | Mar. 24, 1868 |
| 255,965 | Fleury | Apr. 4, 1882 |
| 685,287 | Mende | Oct. 29, 1901 |
| 884,288 | Nash | Apr. 7, 1908 |
| 1,086,843 | Nissenen | Feb. 10, 1914 |
| 1,237,931 | Malvezin | Aug. 21, 1917 |
| 1,970,499 | Dent | Aug. 14, 1934 |
| 2,010,582 | Burns et al. | Aug. 6, 1935 |
| 2,017,892 | Clary | Oct. 22, 1935 |
| 2,109,597 | Richeson | Mar. 1, 1938 |
| 2,316,208 | Woodruff | Apr. 13, 1943 |
| 2,327,282 | McComb | Aug. 17, 1943 |
| 2,340,345 | Richeson | Feb. 1, 1944 |
| 2,593,983 | Chalupa | Apr. 22, 1952 |
| 2,678,739 | Schmid et al. | May 18, 1954 |

FOREIGN PATENTS

| | | |
|---|---|---|
| 114,700 | Great Britain | Apr. 18, 1918 |